UNITED STATES PATENT OFFICE.

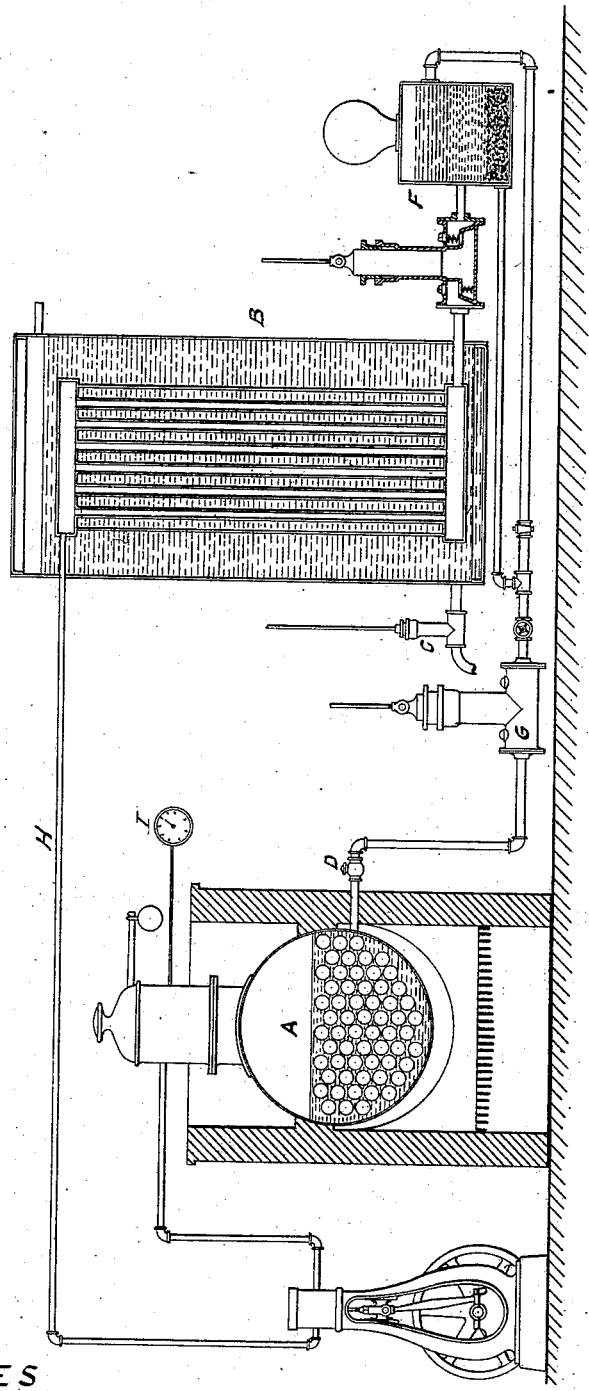

EDWIN L. BRADY, OF NEW YORK, N. Y.

VAPOR-MOTOR.

SPECIFICATION forming part of Letters Patent No. 224,766, dated February 24, 1880.

Application filed December 13, 1879.

*To all whom it may concern:*

Be it known that I, EDWIN L. BRADY, of the city, county, and State of New York, have invented a new and useful Improvement in Motors for Machinery; and I do hereby declare that the following is a full, clear, and exact description thereof, reference being had to the accompanying drawings, and to the letters of reference marked thereon.

It has long been known that bisulphide of carbon was a substance of great latent power, and that when subjected to comparatively low temperatures of heat it would rapidly vaporize and form a gas of high expansive power. For many years, extending through the last half century, it has been the study of certain scientists to devise some means whereby it may be practically used in the industrial arts. The great obstacle to its use resided in its property of eating up oil and other lubricating substances and of roughening all metallic parts with which it came in contact. Hence machinery driven by it would stop after running a short time, and a fresh lubrication would be necessary in order to again start the engine in operation. Certain propositions have been suggested for obviating this difficulty, one of the earliest being to combine liquefied carbonic-acid gas with bisulphuret of carbon, oil, and coal-tar, the bisulphide of carbon, carbonic acid, and coal-tar acting in part as motive powers, while the oil mixes the other substances together and lubricates the machine. Quite a recent proposition is to the effect that the vapor of bisulphide of carbon should be mixed with the vapor of petroleum-oil and the mixture be directed against a piston. There are, however, certain disadvantages incident to the practical use of the foregoing mixtures. It has been conceded as a chemical fact that pure oils or fats by themselves could not be vaporized, the reason being that oils, when subjected to heat, form gas in contradistinction to vapor. The product is dry instead of being moist. Hence it is impossible to produce a mixed vapor which will be sufficiently oily to carry lubrication to the interior of an engine-cylinder, inasmuch as the oil, on coming in contact with the bisulphide of carbon, is at once decomposed into a dry gas, and all lubricating quality possessed by an oily vapor is destroyed.

The object of my invention is to obviate the above disadvantages, and to unite the vapor of the bisulphide of carbon with an improved vapor which will serve as an actual lubricant. With this end in view I subject paraffine-oil to a treatment which saponifies it, and then I unite the vapor of said saponified paraffine with the vapor of bisulphide of carbon. The mixed vapor thus produced consists of two component parts, one of which buoys up and carries the other with it. The paraffine-oil being supplied with sufficient water to provide necessary moisture and the product being saponified with alkali, when subjected to heat the resultant becomes a moist and oily vapor capable of uniting with the vapor of bisulphide of carbon to carry lubrication to the internal working parts of the engine-cylinder.

The drawing represents one form of apparatus for carrying out the invention, it being understood that the same is given merely as an illustration of the principle of operation pursued by me, and that the construction therein shown constitutes no part of my invention.

In the accompanying drawing, which forms part of my specification, A represents a boiler; B, a surface-condenser. C is a circulating-pump attached to the condenser. D is a check-valve affixed to the boiler and attached to the pipe through which the bisulphide of carbon is admitted to the boiler. F is the reservoir at bottom of the condenser, for containing the saponified paraffine-oil with the bisulphide of carbon. G is a double-acting force-pump with valves so arranged as to lift and force against boiler-pressure. It is attached to the inlet-pipe used to carry the fluids, bisulphide of carbon, and saponified paraffine-oil from the reservoir of the condenser to the boiler.

H is an exhaust-pipe connecting the valve-chest of the engine with the inner surface of the tubes or worm of the condenser, which pipe is to carry the exhaust-vapor (after use in the cylinder) back to the condenser to be again condensed into liquid, and afterward transmitted again through the pump G to the boiler.

I is a pressure-gage of any approved construction attached to the boiler.

In all pipes connecting the boiler and engine with condenser and pumps, where flanged joints occur and rubber packing is used between said flanges, the inner edges of the rubber are coated with asphalt, to prevent the rubber becoming solvent from the action of the bisulphide of carbon, and no rubber packing can be used around the piston-rod and valve-stems for same reason; neither must any lubricants of animal, fish, or vegetable oils be used in the cylinder or valve-chest for well understood chemical reasons; but all such lubricants should be saponified paraffine-oil.

The boiler should be first supplied with saponified paraffine-oil and water and said contents heated to a temperature of from 175° to 200° Fahrenheit before introduction of the bisulphide of carbon.

The reservoir of the condenser is provided to hold a supply of bisulphide of carbon; but a space is left above the bisulphide of carbon to hold a packing of water of several inches, which is interposed as a safeguard against accident from ignition.

When the apparatus is in action the vapor returned from the exhaust-pipe of the engine is condensed in the condenser and falls as liquid to the reservoir, and the bisulphide of carbon, being of greater gravity than water, sinks to the bottom at once; but that portion of the condensed vapor which is due to and has its origin from the application of heat to the saponified paraffine-oil will float on the top of the water in the reservoir, to be again transmitted to the boiler by a pipe affixed at a high point in the reservoir for that purpose, and, if desired, branched into the pipe used to transmit the bisulphide of carbon from the reservoir to the boiler, at a point between the pump and the reservoir.

The saponified paraffine-oil in the boiler vaporizes the bisulphide of carbon from its sensibility to heat, and its ability as a vapor-mixer buoying up and carrying with the bisulphide-of-carbon vapor the vapor also of the paraffine-oil, which acts as a lubricant to the internal parts of the engine-cylinder, &c., and prevents the sulphurous deposits from fouling and destroying the surfaces of the metals, which has heretofore prevented the practical use of the bisulphide of carbon as a motor by itself, or with water, or with other ingredients.

Having thus described my invention, what I claim is—

A mixed vapor adapted for use as a motor for machinery, the same consisting of vapor of bisulphide of carbon and vapor of saponified paraffine-oil, substantially as set forth.

EDWIN L. BRADY. [L. S.]

Witnesses:
 J. T. F. RANDOLPH,
 A. A. ABBOTT.